United States Patent [19]
Pace

[11] Patent Number: 5,864,438
[45] Date of Patent: *Jan. 26, 1999

[54] EXTENSIBLE VEHICLE MIRROR

[75] Inventor: Dusty R. Pace, Pendleton, Oreg.

[73] Assignee: Power Vision, LLC, Pendleton, Oreg.

[ * ] Notice: The term of this patent shall not extend beyond the expiration date of Pat. No. 5,572,376.

[21] Appl. No.: 707,633

[22] Filed: Sep. 5, 1996

Related U.S. Application Data

[63] Continuation of Ser. No. 299,480, Aug. 31, 1994, Pat. No. 5,572,376.

[51] Int. Cl.$^6$ .............................. G02B 5/08; G02B 7/18; G02B 7/182
[52] U.S. Cl. .......................... 359/841; 359/842; 359/843; 359/844; 359/877
[58] Field of Search .................................. 359/841, 842, 359/843, 844, 877

[56] References Cited

U.S. PATENT DOCUMENTS

| | | | |
|---|---|---|---|
| 3,820,877 | 6/1974 | Moyer | 359/841 |
| 4,165,156 | 8/1979 | O'Connell | 359/841 |
| 4,466,594 | 8/1984 | Sharp | 248/484 |
| 4,558,930 | 12/1985 | Deedreek | 359/841 |
| 4,613,107 | 9/1986 | Vitaloni | 248/481 |
| 4,758,078 | 7/1988 | Bracamonte | 359/841 |
| 4,786,157 | 11/1988 | Mori et al. | 359/877 |
| 4,911,545 | 3/1990 | Miller | 359/841 |
| 4,921,337 | 5/1990 | Hou | 359/841 |
| 4,936,670 | 6/1990 | Yoo | 359/877 |
| 4,998,812 | 3/1991 | Hou | 359/841 |
| 5,007,724 | 4/1991 | Hou | 359/841 |
| 5,052,792 | 10/1991 | McDonough | 359/865 |
| 5,226,034 | 7/1993 | Nagayama et al. | 359/877 |
| 5,339,192 | 8/1994 | Cho | 359/877 |
| 5,375,014 | 12/1994 | Fujie et al. | 359/841 |

*Primary Examiner*—Cassandra C. Spyrou
*Assistant Examiner*—Mohammod Sikder
*Attorney, Agent, or Firm*—Klarquist Sparkman Campbell Leigh & Whinston, LLP

[57] ABSTRACT

As extensible mirror apparatus for a vehicle including an elongate arm having a rack gear thereon, a mirror housing mounted for moving longitudinally along the arm, and a driving motor and spur gear enclosed within the mirror housing operable to drive such along the arm for extending and retracting the mirror. An extensible and retractable flexible boot provides a cover between the vehicle and mirror housing for portions of apparatus which otherwise would be exposed upon extension of the mirror.

20 Claims, 3 Drawing Sheets

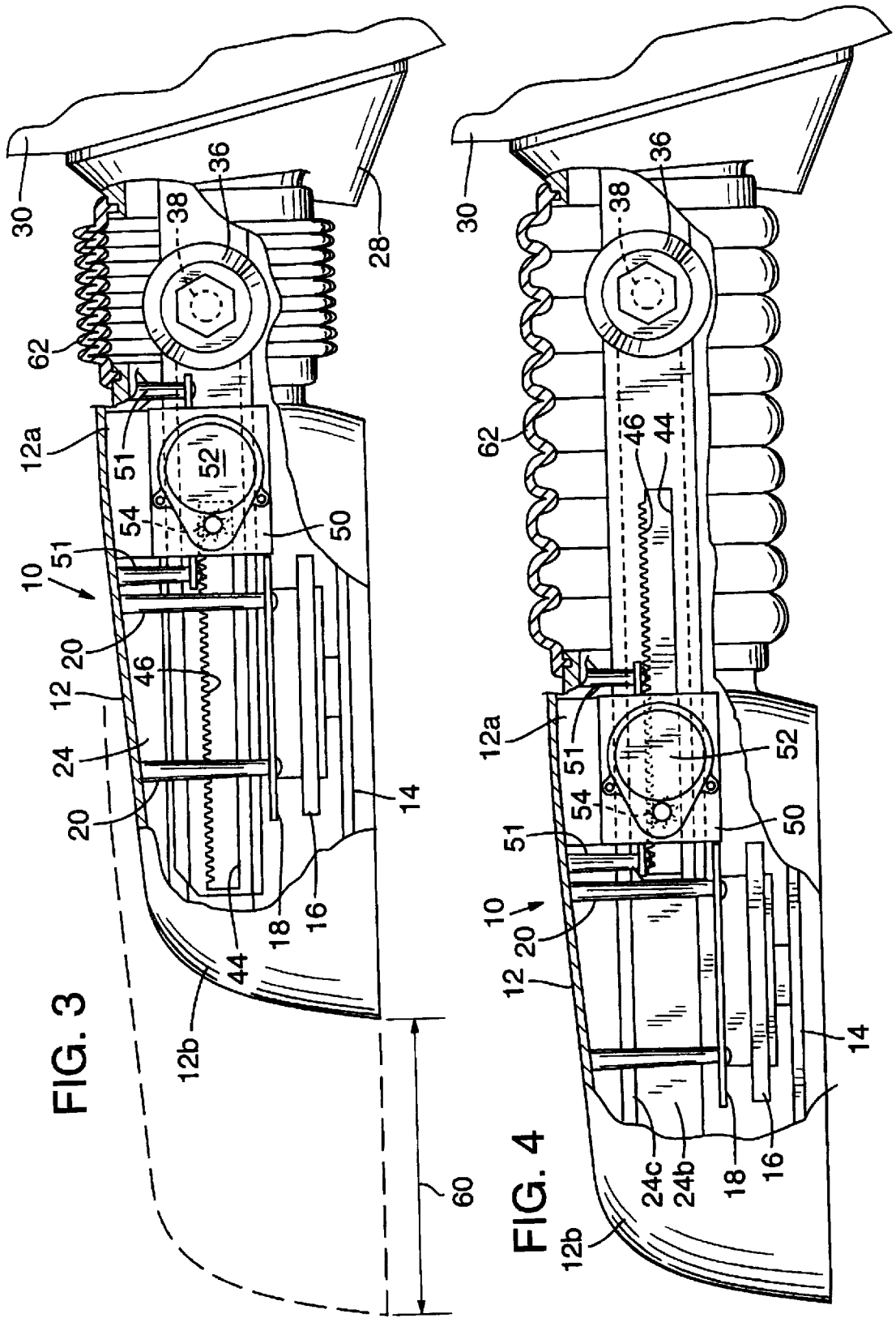

EXTENSIBLE VEHICLE MIRROR

This is a continuation of U.S. patent application Ser. No. 299,480 filed Aug. 31, 1994, now U.S. Pat. No. 5,572,376.

BACKGROUND AND SUMMARY OF THE INVENTION

This invention relates to a vehicle mirror, and more particularly to a mirror which may be extended and retracted under power laterally to the side of a vehicle.

Side view mirrors are well known for vehicles. Often they have the capacity for remote control adjustment in relation to the tilt and angle thereof to be adjusted for convenient viewing from inside the vehicle. It may be advantageous also to have a mirror which usually is disposed in a retracted position closely adjacent the vehicle, and in specific instances may be extended laterally outwardly therefrom. Such would be helpful to see around trailing objects, such as towed trailers.

Extensible mirrors have been known in the past, but these have not always been successful. Prior devices known to applicant generally have had an operating motor secured to the vehicle, with an operating rod or shaft extending outwardly therefrom which is turned to cause the mirror to extend and retract. Others, such as U.S. Pat. No. 4,558,930 to Deedreek have used a form of rack gear driven by a spur gear, but such have had exposed parts which are subject to being affected by the elements, dirt, etc. which may be imposed upon the device.

Applicant has devised a unique extensible vehicle mirror utilizing a reliable rack and pinion gear drive system which should overcome problems which occur in previously known devices.

A general object of the present invention is to provide a novel extensible vehicle mirror which is simple and economical to manufacture and install, yet which is efficient in operation.

More specifically, an object of the present invention is to provide an extensible vehicle mirror in which an elongate arm is adapted to be mounted on and extend laterally outwardly from a vehicle, the arm having a rack gear extending therealong, with a bracket mounted on and movable longitudinally of the arm toward and away from the vehicle. A mirror and a motor are mounted on and movable with the bracket and a drive gear is connected to the motor for engaging the rack gear to move the mirror longitudinally along the arm upon operation of the motor.

A further object of the present invention is to provide such a novel extensible mirror in which a mirror housing mounted on the movable bracket encloses the bracket, mirror, motor and drive gear to protect them from the elements.

Another object is to provide a novel extensible mirror in which an elongate arm on which the mirror housing, bracket and motor are mounted has a slot defined therein with gear teeth along one side to produce a rack gear to provide a stable support arm and a portion of the drive means for the mirror in the integral arm element.

Yet another object of the present invention is to provide such an extensible vehicle mirror in which a flexible extensible-contractible boot interconnects the movable housing and an adapter connected to the vehicle, such that the boot maintains a protective covering over the arm and other elements of the mirror which otherwise would be exposed upon extension of the mirror.

These and other objects and advantages will become more fully apparent as the following description is read in conjunction with the drawings.

DRAWINGS

FIG. 3 is a top plan view on a reduced scale of the extensible mirror apparatus in a retracted position with portions broken away to illustrate internal parts.

FIG. 4 is a top plan view similar to FIG. 3, with the mirror extended.

DETAILED DESCRIPTION OF PREFERRED EMBODIMENT OF THE INVENTION

Figure 1:
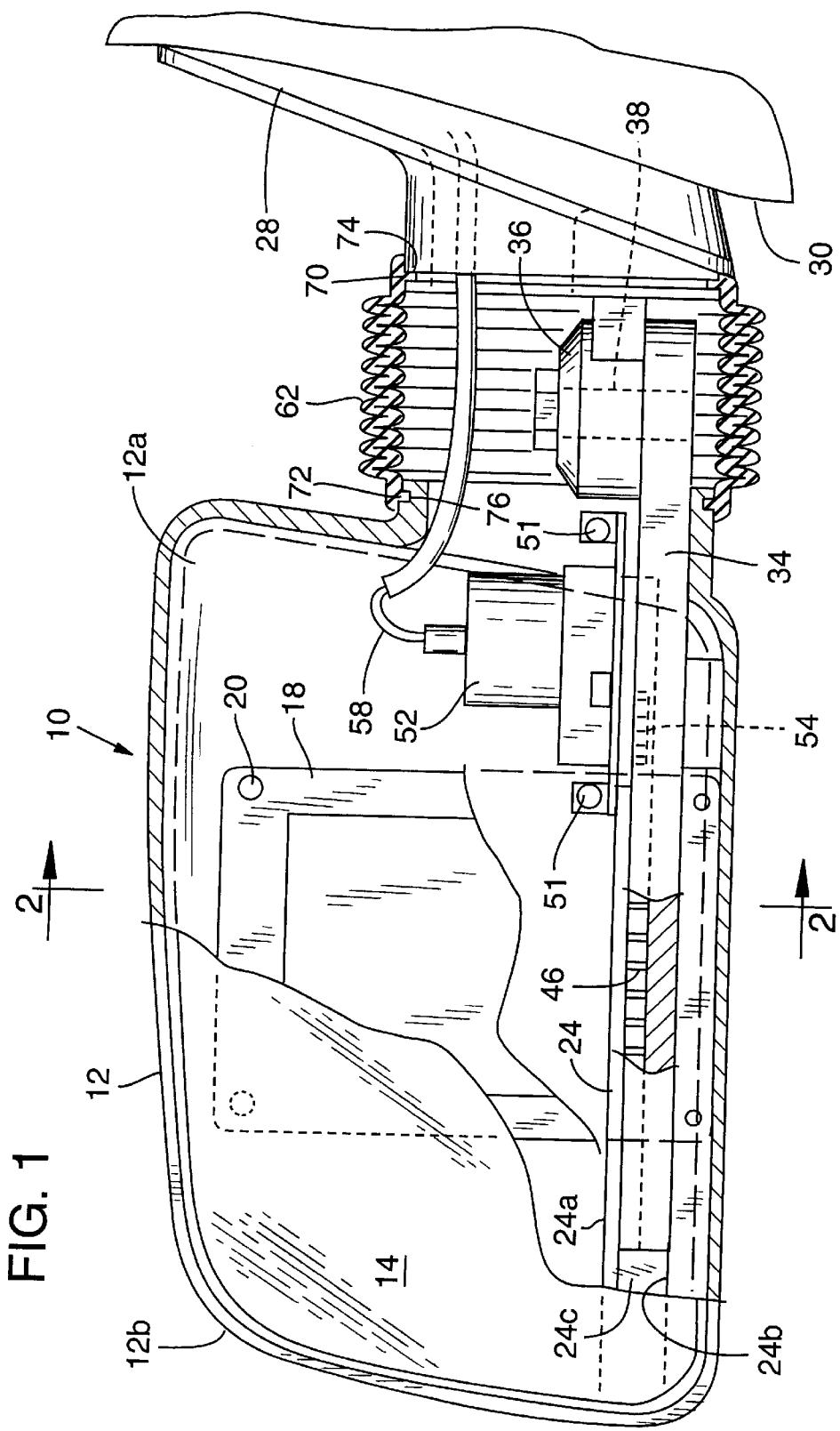
FIG. 1 is a front elevational view of an extensible vehicle mirror apparatus according to an embodiment of the present invention with portions broken away for illustrative purposes.
Figure 2:
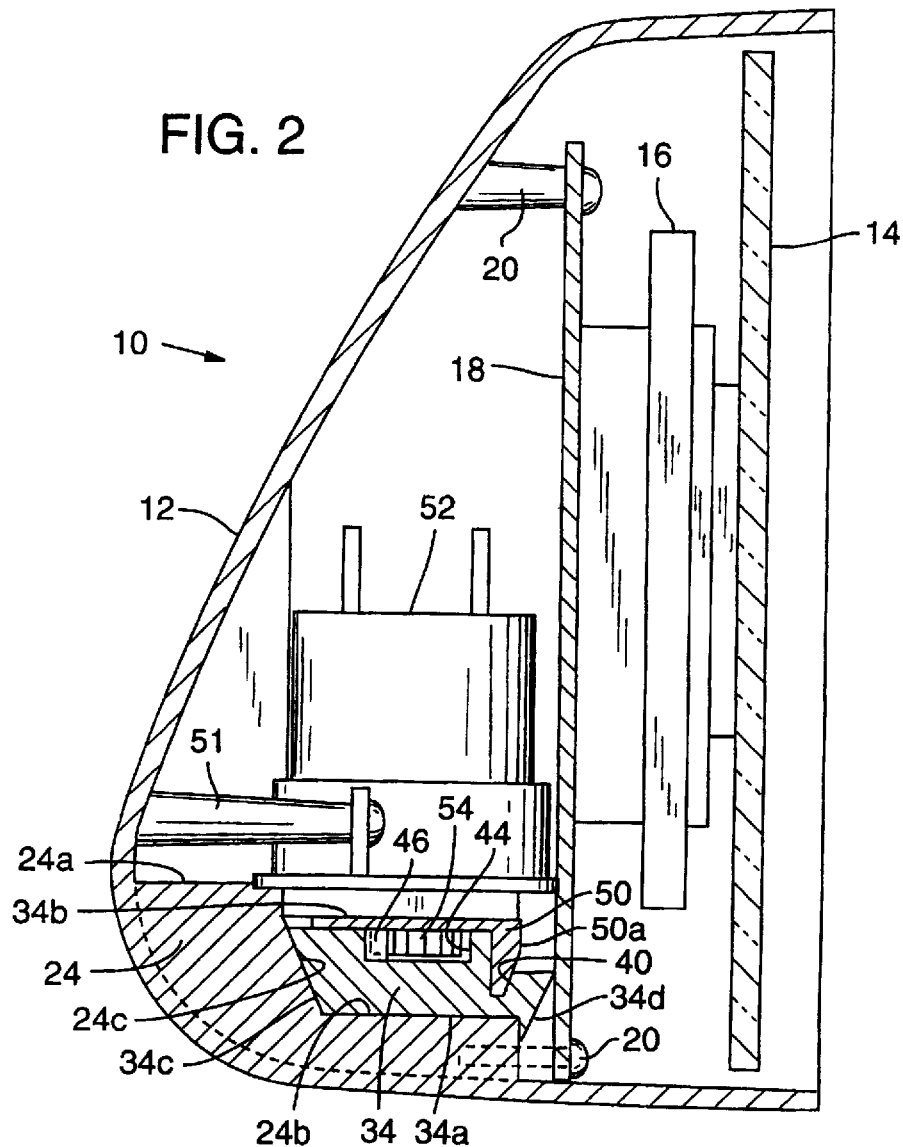
FIG. 2 is an enlarged cross-sectional view taken generally along the line 2—2 in FIG. 1.

Referring first to FIGS. 1, 2 and 3, at 10 is indicated generally an extensible-retractable mirror apparatus according to an embodiment of the invention. The mirror includes a formed plastic housing 12 in which a substantially planar rear view mirror 14 is mounted. Mirror 14 may be of a remotely adjustable style with operator mechanism shown generally at 16 which may be remotely actuated from inside the vehicle to change the angular orientation of the face of the mirror for convenient viewing as is known. The operator mechanism 16, in turn, is secured to an upright mounting plate 18 which is mounted through a series of support pins, or posts, 20 to the interior of housing 12.

The inside of housing 12 is formed with a support shelf portion indicated generally at 24 (see FIG. 2). This support shelf portion extends substantially the full length of the interior of housing 12. It has a substantially horizontally disposed upper shelf region 24a and a substantially horizontally disposed lower shelf region 24b. An angularly disposed joining wall portion 24c extends between shelf portions 24a, 24b.

Referring to FIGS. 1, 3 and 4, an adapter, or connector element, 28 is illustrated secured to a side portion 30 of a vehicle. The connection between such an adapter and a vehicle is well known in the art and will not be described in detail herein.

Extending laterally outwardly from adapter 28 and thus laterally outwardly from side portion 30 of the vehicle, is an elongate arm 34 having a longitudinal axis. The inner end of arm 34, nearest adapter 28 is pivotally connected to adapter 28 through a swivel connector 36. The swivel connector has an upright pin 38 extending therethrough to provide a vertical pivot axis about which arm 34 may swing relative to adapter 28. Such swivel connections for side mirrors of vehicles are known, and thus will not be described in detail here.

The elongate arm 34 has a cross-sectional configuration as illustrated in FIG. 2. Arm 34 has a bottom surface 34a and a top surface 34b substantially parallel thereto. Bottom surface 34a and lower shelf portion 24b of shelf portion of the housing rest in sliding relation to each other. An angularly disposed side surface 34c slidably engages joining wall portion 24c of the support shelf portion. A downwardly projecting lip 34d engages an outer side edge of shelf portion 24. An elongate groove indicated generally at 40 extends longitudinally of arm 34.

An elongate slot 44 is defined in and extends longitudinally of arm 34. A plurality of gear teeth 46 are defined along one side of slot 44 to provide a rack gear extending longitudinally of arm 34 within slot 44.

A bracket, or mounting element, 50 overlies arm 34 and is secured by support posts, or pins, 51 to housing 12. As is best seen in FIG. 2, bracket 50 has a downwardly depending leg portion 50a which is slidably received and runs in groove 40 in arm 34. Remainder portions of bracket 50 ride slidably along the top of arm 34.

Secured to the top of bracket 50 is an electric motor 52. A horizontally disposed spur gear 54, also referred to herein as a drive gear, is operatively connected to motor 52, depends below the upper surface of bracket 50, into slot 44 and engages rack gear teeth 46. Operation of motor 52 turns spur gear 54 about a vertical axis which, in turn, drives bracket 50, housing 12, and mirror 14 longitudinally along arm 34. The motor is reversible to cause the mirror to be extended or retracted relative to the vehicle, as desired. The reflective face of mirror 14 occupies a plane substantially parallel to the longitudinal axis of arm 34 and this movement is substantially parallel to the face of the mirror.

An electrical power conduit, or wire 58 connects motor 52 to a power supply on the vehicle. When power is supplied to motor 52 to drive the spur gear 54 in a clockwise direction as illustrated in FIGS. 3 and 4, housing 12, bracket 50, motor 52, and mirror 14 are moved longitudinally outwardly along arm 34 and away from vehicle 30 from the fully retracted position closest to adapter 28 and vehicle 30 illustrated in FIG. 3 toward the fully extended position farthest from adapter 28 and vehicle 30 illustrated in FIG. 4. Conversely, when power is provided to turn motor 52 in the reverse direction, the housing, mirror, bracket, etc., are returned from the extended position illustrated in FIG. 4 toward the retracted position illustrated in FIG. 3. The extent of extension and retraction permitted is indicated generally by the dimension 60 in FIG. 3.

In other words selected rotation of drive gear 54 by motor 52 is operable to move the bracket, mirror, and motor longitudinally of arm 34, substantially parallel to the face of mirror 14, laterally inwardly and outwardly relative to the adapter and vehicle to selected positions relative to the vehicle. The selected position may be fully retracted, fully extended, or at any selected position between fully extended and fully retracted.

Figure 5:
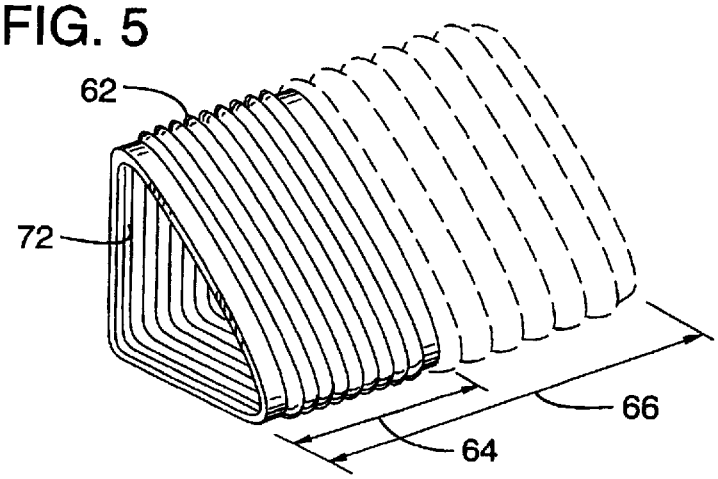
FIG. 5 is a perspective view of an extensible-contractible boot used in the invention.

An accordion-style, flexible elastomeric extensible-contractible boot 62 extends between adaptor 28 and housing 12. The boot is illustrated generally in perspective view in FIG. 5 in solid outline in its retracted configuration, and extended in the dashed outline portion. The retracted dimension is indicated generally at 64 and the extended dimension at 66.

Referring to FIGS. 1, 3 and 4, it will be seen that adaptor 28 has an annular groove, or depression, 70 formed therein and housing 12 has an annular groove, or depression, 72. Boot 62 has annular inwardly directed projections 74, 76 at its opposite ends, respectively. Projections 74, 76 frictionally fit in grooves 70, 72 respectively to provide protection over the space between the housing and adaptor.

It will be noted that housing 12 has an inner end portion 12a nearest adaptor 28, and an outer end portion 12b spaced outwardly therefrom. The bracket 50, motor 52 and spur gear 54 are mounted within the inner end portion of the housing.

With mirror 14, bracket 50, motor 52, and spur gear 54 are all held within housing 12 and thus are generally protected from the elements. Swivel connector 36 is in a position intermediate housing 12 and adaptor 28. The purpose of boot 62 is to provide a covering for the swivel connector and that portion of the arm which otherwise would be exposed upon movement of the housing away from the vehicle.

Operation of the present invention is such that when the mirror 14 in its retracted position, as illustrated in FIGS. 1 and 3, it is in a position close to the vehicle as would be found for the usual side view mirror. Should it be necessary to extend the mirror to be able to clear vision for towed or other impediments to rear vision, it is a simple matter to supply power to motor 52 to cause rotation of spur gear 54 driving the housing, motor, bracket, and mirror 14 laterally outwardly from the adaptor and vehicle to the position illustrated in FIG. 4 spaced further from the vehicle. Since the motor and gear remain enclosed within housing 12 they continue to be protected from the elements and provide direct driving force to move the housing along the rack gear 46 of arm 34. Flexible boot 62 provides an enclosure for portions of the apparatus which otherwise would be exposed upon extension of the mirror.

While a preferred embodiment to the invention has been described herein, it should be apparent that variations and modifications are possible without departing from the spirit of the invention.

What is claimed is:

1. An extensible mirror apparatus for a vehicle comprising
   an elongate arm having a longitudinal axis adapted to be mounted on and extend laterally outwardly from the vehicle,
   a rack gear extending longitudinally along said arm,
   a bracket mounted on and movable longitudinally of said arm, laterally inwardly and outwardly from the vehicle, between fully extended and fully retracted positions.
   a mirror and a motor mounted on and movable with said bracket, and
   a drive gear drivingly connected to said motor and engaging said rack gear operable to move said bracket, mirror and motor longitudinally along said arm laterally inwardly and outwardly to selected positions relative to the vehicle between said fully extended and fully retracted positions upon operation of said motor.

2. The apparatus of claim 1, which further comprises a housing mounted on and movable with said bracket in which housing said bracket, mirror, motor and drive gear are mounted.

3. The apparatus of claim 1, which further comprises a power supply conduit extending from said motor toward the vehicle.

4. The apparatus at claim 1, wherein the face of said mirror occupies a plane substantially parallel to the longitudinal axis of said arm and operation of the motor moves said bracket, mirror and motor along a path parallel to said longitudinal axis.

5. The apparatus of claim 1, which further comprises a mounting element adapted to be attached to the vehicle and said arm is supported on and extends outwardly from said mounting element.

6. The apparatus of claim 5, which further comprises a swivel connector and said arm is operatively connected to said mounting element through said swivel connector.

7. The apparatus of claim 1, wherein said arm has an elongate slot formed therein extending longitudinally of the arm and one edge of said slot has gear teeth formed thereon to provide said rack gear.

8. The apparatus of claim 7, wherein said drive gear extends into said slot to engage said gear teeth.

9. The apparatus of claim 1, which further comprises a housing mounted on and movable with said bracket in which housing said bracket, mirror, motor and drive gear are mounted, said housing having an inner end portion adapted to be positioned nearest the vehicle and an outer end spaced outwardly therefrom, and said bracket and motor are enclosed in said inner end portion of said housing.

10. The apparatus of claim 9, which further comprises an extensible-contractible flexible boot extending between said housing and the vehicle covering the portion of the arm which otherwise would be exposed upon movement of said housing away from the vehicle.

11. An extensible mirror apparatus for a vehicle comprising an adapter for attaching to a vehicle, an elongate arm having a longitudinal axis supported on and extending laterally outwardly from the adapter, a rack gear extending longitudinally along said arm, a bracket mounted on and movable longitudinally of said arm toward and away from the adapter between a fully retracted position adjacent the adapter and a fully extended position spaced a greater distance from the adapter, a mirror and a motor mounted on and movable with said bracket, and a drive gear drivingly connected to said motor and engaging said rack gear operable to move said bracket, mirror and motor longitudinally along said arm to selected positions between said fully retracted and fully extended positions upon operation of said motor.

12. The apparatus of claim 11, wherein said bracket is slidably mounted on said arm for movement longitudinally therealong.

13. The apparatus of claim 11, which further comprises a housing mounted on and movable with said bracket in which housing said bracket, mirror, motor and drive gear are mounted.

14. The apparatus of claim 13, which further comprises an extensible-contractible flexible boot extending between said housing and the adapter covering the portion of the arm which otherwise would be exposed upon movement of said housing away from the adapter.

15. The apparatus of claim 11, which further comprises a swivel connector and said arm is operatively connected to said adapter through said swivel connector.

16. The apparatus of claim 11, wherein said arm has an elongate slot formed therein extending longitudinally of the arm and one edge of said slot has gear teeth formed thereon to provide said rack gear.

17. The apparatus of claim 16, wherein said drive gear extends into said slot to engage said gear teeth.

18. The apparatus of claim 11, which further comprises a housing mounted on and movable with said bracket in which housing said bracket, mirror, motor and drive gear are mounted, said housing having an inner end portion positioned nearest the adapter and an outer end spaced outwardly therefrom, and said bracket and motor are enclosed in said inner end portion of said housing.

19. The apparatus of claim 18, which further comprises an extensible-contractible flexible boot extending between said housing and the adapter covering the portion of the arm which otherwise would be exposed upon movement of said housing away from the vehicle.

20. An extensible mirror apparatus for a vehicle comprising an adapter for attaching to a vehicle, a swivel connector mounted on said adapter, an elongate arm mounted on the swivel connector and extending laterally outwardly from the swivel connector and adapter, said arm having an elongate slot formed therein extending longitudinally of the arm, a series of gear teeth formed in said slot defining a rack gear extending longitudinally along said arm, a bracket slidably mounted on and movable longitudinally of said arm toward and away from the adapter between a fully retracted position adjacent the adapter and a fully extended position spaced a greater distance from the adapter, a housing mounted on said bracket and movable therewith having an inner end portion nearest the adapter and an outer end portion space outwardly therefrom, a mirror and a motor mounted on and movable with said bracket, said bracket and motor being enclosed in the inner end portion of said housing, a drive gear drivingly connected to said motor and engaging said rack gear operable to move said bracket, housing, mirror and motor longitudinally along said arm to selected positions between said fully retracted and fully extended positions upon operation of said motor, and an extensible-contractible boot extending between said housing and the adapter covering the portion of the arm which otherwise would be exposed upon movement of the housing away from the adapter.

\* \* \* \* \*